United States Patent
Reinhold et al.

(10) Patent No.: US 10,889,007 B2
(45) Date of Patent: Jan. 12, 2021

(54) END EFFECTOR ASSEMBLY FOR HOLDING A WORKPIECE

(71) Applicant: Broetje-Automation GmbH, Rastede (DE)

(72) Inventors: Raphael Reinhold, Wittmund (DE); Sascha Quast, Oldenburg (DE)

(73) Assignee: Broetje-Automation GmbH, Rastede (DE)

( * ) Notice: Subject to any disclaimer, the term of this patent is extended or adjusted under 35 U.S.C. 154(b) by 28 days.

(21) Appl. No.: 16/337,753

(22) PCT Filed: Jul. 20, 2017

(86) PCT No.: PCT/EP2017/068305
§ 371 (c)(1),
(2) Date: Mar. 28, 2019

(87) PCT Pub. No.: WO2018/059776
PCT Pub. Date: Apr. 5, 2018

(65) Prior Publication Data
US 2020/0039092 A1    Feb. 6, 2020

(30) Foreign Application Priority Data
Sep. 28, 2016   (DE) .................. 10 2016 011 618

(51) Int. Cl.
*B25J 15/06*     (2006.01)
*B65G 47/91*     (2006.01)

(52) U.S. Cl.
CPC .......... *B25J 15/0625* (2013.01); *B65G 47/91* (2013.01)

(58) Field of Classification Search
CPC ............................. B25J 15/0625; B65G 47/91
(Continued)

(56) References Cited

U.S. PATENT DOCUMENTS 3,993,301 A * 11/1976 Vits ...................... B65H 3/0808
                                                      271/98
5,067,762 A * 11/1991 Akashi ................. B25J 15/0616
                                                      271/97
(Continued)

FOREIGN PATENT DOCUMENTS

DE       10319272      11/2004
DE       60313279      12/2007
(Continued)

OTHER PUBLICATIONS

"German Search Report," for German Patent Application No. 102016011618.8 (priority application to our file 218.0186USWO) dated May 29, 2017 (6 pages), no English translation.
(Continued)

*Primary Examiner* — Paul T Chin
(74) *Attorney, Agent, or Firm* — Pauly, DeVries Smith & Deffner LLC

(57) ABSTRACT

The disclosure relates to an end effector arrangement having an end effector for a manipulator and having a control for the end effector, wherein the end effector has a tool arrangement having a plurality of gripper devices for holding a planar workpiece, wherein at least one gripper device has a Bernoulli gripper unit, which has a discharge unit for channeling a flow $S_B$ from the Bernoulli gripper unit between gripper device and workpiece in a manner such that, in a delimited region between gripper device and the workpiece, the flow $S_B$ generates a low pressure for holding the workpiece, and wherein at least one gripper device has a different gripper unit, which carries the workpiece according to a physical principle which differs from that of the Bernoulli gripper unit.

18 Claims, 6 Drawing Sheets

(58) Field of Classification Search
USPC .......................................... 294/183, 64.3, 65
See application file for complete search history.

(56) References Cited

U.S. PATENT DOCUMENTS

| | | | | |
|---|---|---|---|---|
| 5,324,087 A * | 6/1994 | Shimose | ............... | B65G 47/91 |
| | | | | 294/185 |
| 6,431,623 B1 * | 8/2002 | Roeters | ................ | B65G 47/91 |
| | | | | 271/90 |
| 7,398,735 B1 * | 7/2008 | Sunderland | .......... | B65G 47/911 |
| | | | | 104/10 |
| 7,597,370 B2 * | 10/2009 | Tanae | ..................... | B65G 47/91 |
| | | | | 294/64.3 |
| 2001/0046435 A1 * | 11/2001 | Gibbel | .................. | B65G 59/04 |
| | | | | 414/795.5 |
| 2010/0171331 A1 | 7/2010 | Jonas et al. | | |
| 2018/0029807 A1 * | 2/2018 | Oono | ................ | B65G 49/061 |
| 2019/0047158 A1 * | 2/2019 | Petrovski | ............. | B25J 15/0061 |
| 2019/0240847 A1 * | 8/2019 | Quast | ................ | B25J 15/0616 |

FOREIGN PATENT DOCUMENTS

| | | |
|---|---|---|
| DE | 102011106214 | 12/2012 |
| DE | 102015009177 | 1/2017 |
| JP | 2003048620 | 2/2003 |
| JP | 2003128279 | 5/2003 |
| JP | 2010264551 | 11/2010 |
| WO | 2018059776 | 4/2018 |

OTHER PUBLICATIONS

"International Search Report and Written Opinion," for PCT Application No. PCT/EP2017/068305 (priority application to our file 218.0186USWO) dated Nov. 17, 2017 (19 pages) with English translation.

International Preliminary Report on Patentability for PCT Application No. PCT/EP2017/068305 (corresponding to our file 218.0186USWO) dated Apr. 11, 2019 (9 pages). English Translation.

* cited by examiner

END EFFECTOR ASSEMBLY FOR HOLDING A WORKPIECE

CROSS-REFERENCE TO RELATED APPLICATIONS

This application is a national stage application under 35 U.S.C. 371 of International Patent Application Serial No. PCT/EP2017/068305, entitled "End Effector Assembly," filed Jul. 20, 2017, which claims priority from German Patent Application No. DE 10 2016 011 618.8, filed Sep. 28, 2016, the disclosure of which is incorporated herein by reference.

FIELD OF THE TECHNOLOGY

The disclosure relates to an end effector arrangement having an end effector for a manipulator and having a control for the end effector, a method for operating an end effector arrangement and a manipulator.

BACKGROUND

Various types of gripper devices for end effectors of manipulators are known from the prior art. These are, for example, vacuum gripper devices and Bernoulli gripper devices. Vacuum gripper devices generally have a suction chamber in which a low static pressure is generated for holding the workpiece. The low pressure can be generated according to the Venturi principle or by means of a low-pressure source. Moreover, and independently of this, so-called Bernoulli gripper devices are known, which generate a flow between gripper device and workpiece in such a way that a low pressure for holding the workpiece is produced between the Bernoulli gripper device and the workpiece.

In practice, it has been shown that neither vacuum gripper devices nor Bernoulli gripper devices are able to fully meet requirements within the framework of a handling procedure. Although the vacuum gripper devices enable reliable holding in the manner of a fixed bearing, albeit associated with restricted gripper accuracy, the Bernoulli gripper devices enable floating holding, so that alignment of the workpiece is possible at any time. However, this only enables low transport speeds.

SUMMARY

The disclosure is based on the object of providing a gripper device better meets the requirements within the framework of a handling procedure.

In an end effector arrangement according to the disclosure this object is achieved.

As a result of the gripper device being equipped both with a Bernoulli gripper unit and with a different gripper unit, the advantages of varying gripper devices can be combined with each other. In detail, the associated control is designed such that, during the holding of the workpiece, it switches the end effector between holding the workpiece by means of at least one Bernoulli gripper unit and holding the workpiece with at least one different gripper unit. According to the proposal, it is possible, for example, to switch on Bernoulli gripper units to deform the workpiece and to use the different gripper units to pick up and/or transport and/or deposit the workpiece. Flexible handling of workpieces with widely varying dimensions at high process speeds is enabled with one and the same end effector arrangement.

It is the case here, that a gripper device has the Bernoulli gripper unit and the different gripper unit. With this, it can be that the gripper device is formed as described in the patent application submitted on the same filing date. In this respect, this forms the subject matter of this application.

The gripper unit which carries the workpiece according to a different physical principle can be a vacuum gripper unit having a suction chamber, wherein, in the suction chamber and therefore in a delimited region between the vacuum gripper unit and the workpiece surface, a low pressure can be generated for holding the workpiece. Vacuum gripper units have proven effective in particular for holding workpieces in a fixed manner.

According to some embodiments, it is proposed that the end effector has an actuating arrangement, the adjustment of which enables the gripper devices of the tool arrangement to be adjusted with respect to each other. The end effector can further have a carrier arrangement on which the gripper devices forming the tool arrangement are arranged, wherein, by means of the actuating arrangement, the gripper devices are adjustable with respect to each other via an adjustment of the carrier arrangement. It is thus possible to deform the workpiece after it is picked up and before it is deposited. In particular, for producing fibre composite components, it has proven effective if the end effector adapts the shape of the workpiece to the shape of the depository before it is deposited. With this, it can be that the actuating arrangement has at least one, in particularly continuously adjustable actuating drive, which acts on the carrier for the deformation thereof, in particular from the side of the carrier which is remote from the workpiece. A plurality of actuating drives can be provided, which are arranged distributed over the surface of the carrier. In this case, in particular, the use of varying actuating drives has proven effective.

In this case, the end effector of the end effector arrangement is formed as described in DE 10 2011 106 214 A1 and/or in DE 10 2015 009 177, which, in this respect, form the subject matter of this application.

Moreover, the object described at the outset is achieved in terms of the method by a method according to various embodiments. The advantages achieved are the same as those described above for the end effector arrangement. The described end effector arrangement is thereby used for the method.

According to various embodiments, during the holding of the workpiece, the control switches a gripper device between holding by means of a Bernoulli unit and holding by means of the different gripper unit, in particular the vacuum gripper unit. By providing gripper devices with both a Bernoulli gripper unit and a different gripper unit, a particularly compact configuration of the gripper device is enabled, which can also handle workpieces of varying sizes very flexibly.

In various embodiments, it can be provided that the end effector shapes the workpiece via an adjustment of the switch arrangement prior to the depositing of the workpiece. This has proven effective in particular for producing fibre composite components and/or hybrid components.

According to various embodiments, it is proposed that the end effector, holding the workpiece, displaces this relative to the tool arrangement. It is therefore not inevitably necessary to deposit the workpiece and pick it up again in order to realize a displacement on the end effector. The end effector can displace the workpiece relative to the tool arrangement by pressing against an, in particular stationary, aligning face, or the end effector can displace the workpiece relative to the tool arrangement by shaping the workpiece. This is even possible during the transportation to the deposit point.

According to various embodiments, the control is formed for switching the gripper device to various operating modes individually or in groups. Especially flexible control of the end effector is thus possible.

According to various embodiments, it is proposed that the workpiece is picked up and/or deposited by the end effector with at least one gripper device, such as with the majority of the active gripper devices or all active gripper devices, in the vacuum operating mode. Picking up the workpiece in the vacuum operating mode or depositing it in the vacuum operating mode enables the workpiece to also be reliably deposited in relation to other workpieces which may be located in the vicinity of the deposit point or pick-up point.

Moreover, the above-mentioned object is achieved by a manipulator according to the disclosure.

The advantages achieved with the manipulator according to the proposal are the same as those above in conjunction with the end effector arrangement and the method described above.

The manipulator can be formed with an end effector arrangement of the type described above and/or for carrying out a method of the type described above.

Various embodiments provide an end effector arrangement comprising an end effector for a manipulator and a control for the end effector, wherein the end effector has a tool arrangement having a plurality of gripper devices for holding a workpiece over a tool surface, wherein at least one gripper device has a Bernoulli gripper unit, which has a discharge unit for channeling a flow from the Bernoulli gripper unit between gripper device and workpiece surface in a manner such that, in a region between gripper device and workpiece surface, the flow generates a low static pressure for holding the workpiece, and wherein at least one gripper device has a different gripper unit, which holds the workpiece according to a physical principle which differs from that of the Bernoulli gripper unit, wherein the control is designed such that, during the holding of the workpiece, it switches the end effector between holding the workpiece by means of at least one Bernoulli gripper unit and holding the workpiece with at least one different gripper unit.

In some embodiments, a gripper device has the Bernoulli gripper unit and the different gripper unit.

In some embodiments, the different gripper unit, which carries the workpiece according to a different physical principle, is a vacuum gripper unit having a suction chamber, wherein, in the suction chamber and therefore in a delimited region between the vacuum gripper unit and the workpiece, a low pressure can be generated for holding the workpiece.

In some embodiments, a gripper device having a Bernoulli gripper unit has a Bernoulli operating mode, in which the workpiece is held by the Bernoulli gripper unit, and/or in that a gripper device having a vacuum gripper unit has a vacuum operating mode, in which the workpiece is held by the vacuum gripper unit, wherein a gripper device has a Bernoulli gripper unit for operating the gripper device in a Bernoulli operating mode and a vacuum gripper unit for operating the gripper device in a vacuum operating mode, wherein the gripper device has a combined operating mode, in which the workpiece is held by the Bernoulli gripper unit and by the vacuum gripper unit.

In some embodiments, the end effector has an actuating arrangement, the adjustment of which enables the gripper devices of the tool arrangement to be adjusted in relation to each other, wherein the end effector has a carrier arrangement on which the gripper devices forming the tool arrangement are arranged and in that, by means of the actuating arrangement, the gripper devices are adjustable with respect to each other via an adjustment of the carrier arrangement.

In some embodiments, the actuating arrangement has at least one, in particular continuously, adjustable actuating drive, which acts on the carrier for the deformation thereof, in particular from the side of the carrier which is remote from the workpiece, wherein a plurality of actuating drives are provided, which are arranged distributed over the surface of the carrier.

Various embodiments provide a method for operating an end effector arrangement according to the disclosure or a manipulator having an end effector arrangement according to the disclosure, wherein the end effector has a tool arrangement having a plurality of gripper devices for holding a planar workpiece, wherein, during the holding of the workpiece, the control switches between holding the workpiece by means of at least one Bernoulli gripper unit and holding the workpiece with at least one different gripper unit, in particular a vacuum gripper unit.

In some embodiments, during the holding of the workpiece, the control switches a gripper device between holding the workpiece by means of a Bernoulli gripper unit and holding the workpiece by means of the different gripper unit, in particular the vacuum gripper unit.

In some embodiments, the end effector shapes the workpiece via an adjustment of the actuating device prior to the depositing of the workpiece.

In some embodiments, the end effector, holding the workpiece, displaces this relative to the tool arrangement, such as the end effector displaces the workpiece relative to the tool arrangement by pressing against an, in particular stationary, aligning face, or in that the end effector displaces the workpiece relative to the tool arrangement by shaping the workpiece.

In some embodiments, to displace the workpiece relative to the tool arrangement, all active gripper devices are operated in the Bernoulli operating mode.

In some embodiments, the control is formed for switching the gripper devices to various operating modes individually or in groups.

In some embodiments, the workpiece is picked up and/or deposited by the end effector with at least one gripper device in the vacuum operating mode.

In some embodiments, following the picking up of the workpiece, at least one gripper device, such as the majority of the active gripper devices, in particular all active gripper devices, is or are switched from a vacuum operating mode to a Bernoulli operating mode during the holding of the workpiece, and/or in that, prior to the depositing of the workpiece, at least one gripper device, such as the majority of the active gripper devices, in particular all active gripper devices, is or are switched from a Bernoulli operating mode to a vacuum operating mode during the holding of the workpiece.

In some embodiments, at least one gripper device, such as at least two gripper devices, further such as precisely two gripper devices, remain in the vacuum operating mode.

In some embodiments, following the picking up of the workpiece and/or prior to the depositing of the workpiece, in particular during transportation and/or shaping of the workpiece, the workpiece is held by the end effector by means of the majority of the active gripper devices, such as all active gripper devices, in particular with the exception of one or two gripper devices, in the Bernoulli operating mode.

In some embodiments, during the depositing of the workpiece in the vacuum operating mode, a compressed air pulse of at least one Bernoulli gripper unit, such as at least a majority of the Bernoulli gripper units, is generated to release the gripper devices from the workpiece.

Various embodiments provide a manipulator, in particular robot, having at least three axes, having an end effector arrangement as described herein and/or for carrying out a method as described herein.

BRIEF DESCRIPTION OF THE DRAWINGS

Various details are explained in more detail below, with reference to a drawing which merely illustrates exemplary embodiments. The drawing shows.

DETAILED DESCRIPTION

Figure 1:
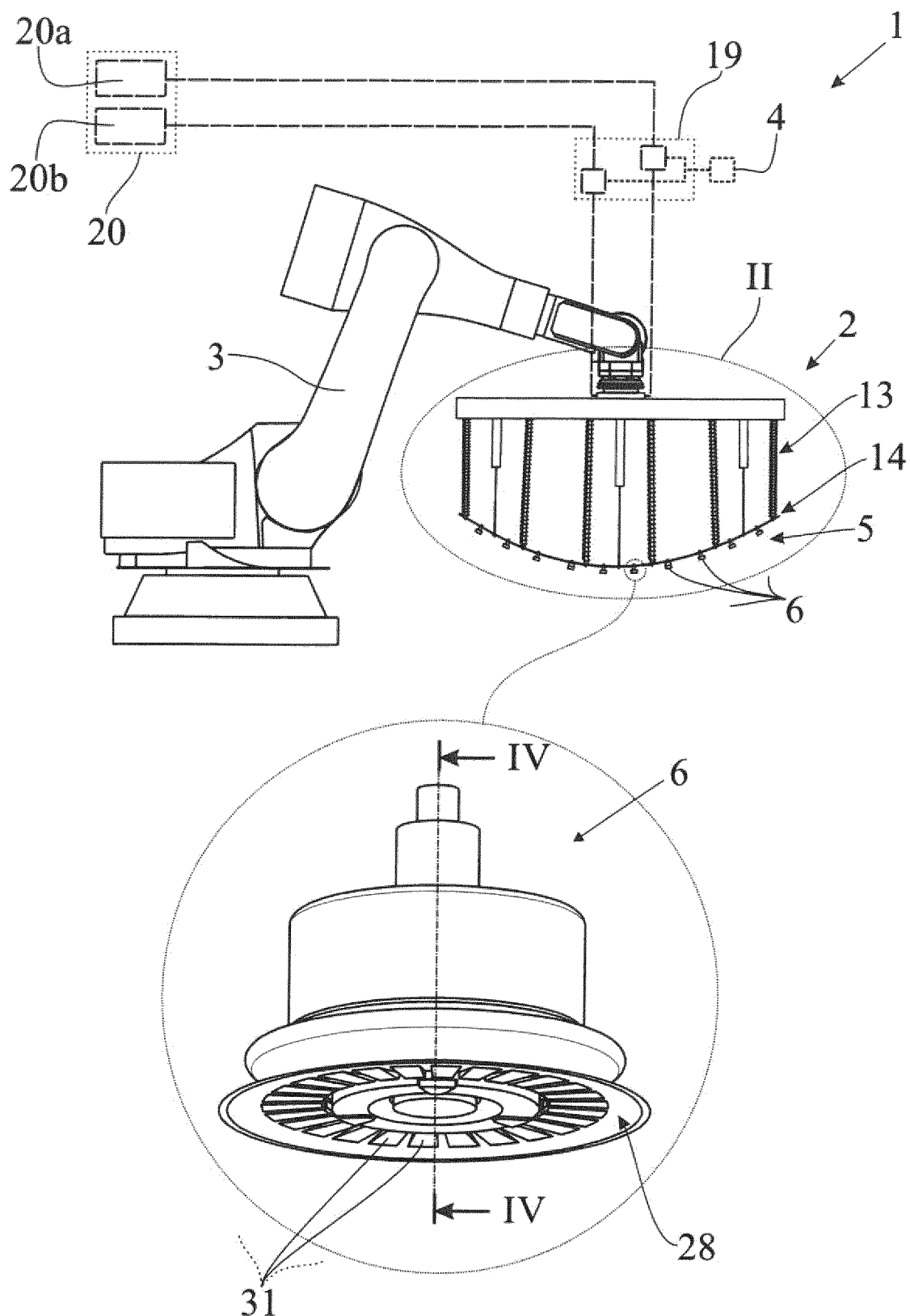
FIG. 1 an end effector arrangement according to the proposal, the end effector of which is arranged on a manipulator according to the proposal.

An end effector arrangement 1 according to the proposal, having an end effector 2 for a manipulator 3 and having a control 4 for the end effector 2, is shown in FIG. 1. The manipulator 3, in particular robot, can have at least three axes, in particular four, five, or six axes. A tool arrangement 5 having a plurality of gripper devices 6 for holding a workpiece 7 over its workpiece surface 22 is further provided.

The workpiece 7 can be a three-dimensional workpiece 7, such as a packet or a structural component, for example; in particular, the workpiece 7 can be a structural component of a land motor vehicle and/or a structural component of an aircraft.

However, pliable materials as the workpiece 7 can also be held with the end effector 2. These pliable materials can be, in particular, aluminium sheets or aluminium foils and/or fibre materials, in particular fibre mats. Fibre materials can refer to dry fibres, in particular fibre mats, and/or they can be pre-impregnated fibres, in particular pre-impregnated fibre mats, so-called pre-pregs.

Both air-permeable and air-tight workpieces can also be held with the end effector 2.

The end effector has proven effective in particular for producing hybrid components, such as Glare®. In this case, these hybrid components are produced by laying a plurality of pliable materials on top of each other. Planar glass fibre or CFC components can also be produced with the end effector 2 according to the proposal.

At least one gripper device 6 has a Bernoulli gripper unit 8 with a discharge unit 9 for channelling a flow $S_B$ from the Bernoulli gripper unit 8 between gripper device 6 and workpiece 7 in a manner such that, in a delimited region between gripper device 6 and the workpiece surface 22, the flow $S_B$ generates a low pressure for holding the workpiece 7.

Moreover, at least one gripper device 6 has a different gripper unit 10, which carries the workpiece 7 according to a physical principle which differs from that of the Bernoulli gripper unit 8.

The control 4 is now designed such that, during the holding of the workpiece 7, it switches the end effector 2 between holding the workpiece 7 by means of at least one Bernoulli gripper unit 8 and holding the workpiece with at least one different gripper unit 10.

In this case, at least one Bernoulli gripper unit 8 is therefore switched off and a different gripper unit 10 is switched on, or a different gripper unit 10 is switched off and a Bernoulli gripper unit 8 is switched on. It is thus possible to always apply the workpiece 7 with the gripper device 6 which is ideal for the task to be carried out directly by the manipulator 3 or end effector 2. This can save on energy and enable certain tasks to be performed in an improved manner.

It is the case here, that a gripper device 6 has the Bernoulli gripper unit 8 and the different gripper unit 10. In some embodiments, the majority of the gripper devices 6, in particular all gripper devices 6, of the tool arrangement 5 have the Bernoulli gripper units 8 and the different gripper unit 10.

It has proven particularly effective that the gripper unit 10, which carries the workpiece 7 according to a different physical principle, is a vacuum gripper unit 11 having a suction chamber 12, wherein, in the suction chamber 12 and therefore in a delimited region between the vacuum gripper unit 10 and the workpiece 7, a low pressure can be generated for holding the workpiece 7.

A gripper device 6 having a Bernoulli gripper unit 8 can include a Bernoulli operating mode, in which the workpiece 7 is held by the Bernoulli gripper unit 8, and/or a gripper device 6 having a vacuum gripper unit 11 has a vacuum operating mode, in which the workpiece 7 is held by the vacuum gripper unit 11.

It is further the case here, that a gripper device 6 has a Bernoulli gripper unit 8 for operating the gripper device 6 in a Bernoulli operating mode and a vacuum gripper unit 11 for operating the gripper device 6 in a vacuum operating mode. Moreover, the gripper device 6 can optionally have a combined operating mode, in which the workpiece 7 is held by the Bernoulli gripper unit 8 and by the vacuum gripper unit 11.

Figure 2:
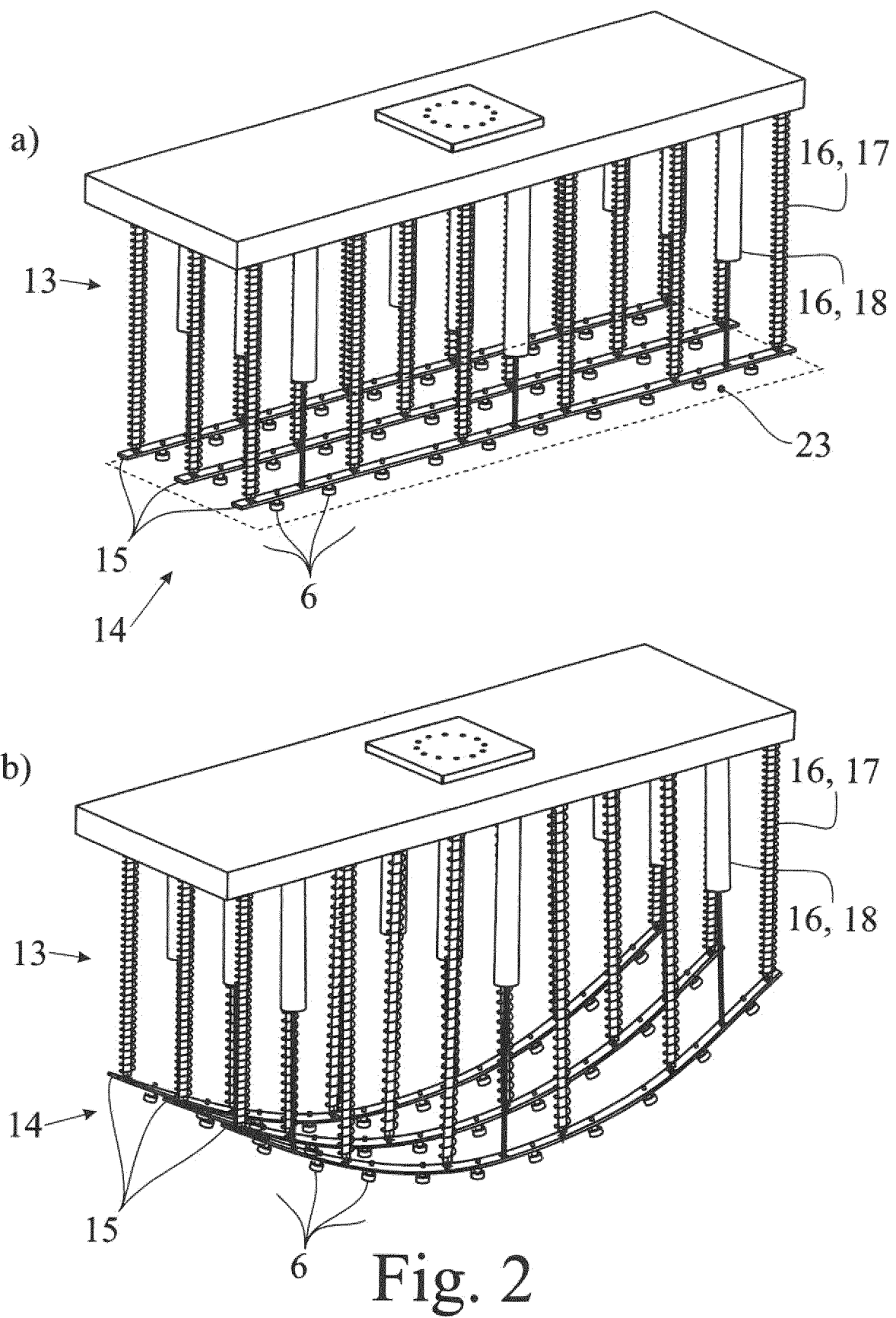
FIG. 2 an end effector of an end effector arrangement according to the proposal.
Figure 3:
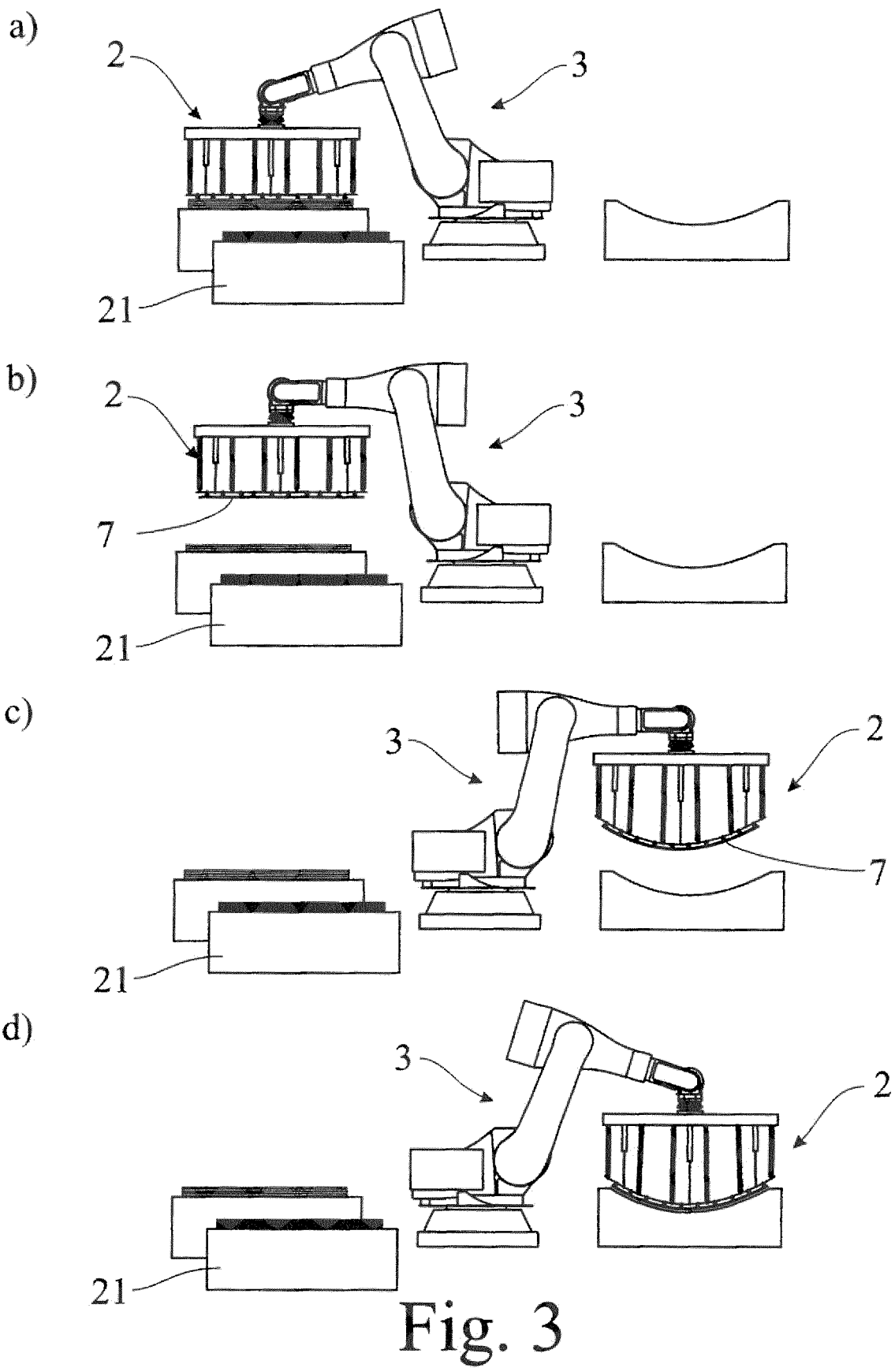
FIG. 3 a manipulator according to the proposal during the manufacture of a hybrid component.

A configuration of the gripper device 6 or the gripper devices 6 will be explained in detail further below with reference to FIGS. 4, 5 and 6. However, firstly, a configuration of the end effector 2, as illustrated in FIGS. 1 to 3, will be discussed.

The end effector 2 has an actuating arrangement 13, the adjustment of which enables the gripper devices 6 of the tool arrangement 5 to be adjusted with respect to each other, c.f. FIG. 2. In addition, the end effector 2 can have a carrier arrangement 14 on which the gripper devices 6 forming the tool arrangement 5 are arranged and wherein, by means of the actuating arrangement 13, the gripper devices 6 are adjustable with respect to each other via an adjustment of the carrier arrangement 14. This is shown by way of example in the sequence of FIG. 3. It is thus possible to shape a held workpiece 7.

The carrier arrangement 14 has at least one, in some embodiments at least two, in further embodiments at least three, carriers 15. The carriers are configured at least partially from a deformable material, in particular an elastically deformable material. This can be, in particular, a plastics material and/or a rubber material. In addition, it can be provided that the carriers 15 of the carrier arrangement 14 are connected to each other.

The actuating arrangement 13 has at least one, in particular continuously, adjustable actuating drive 16. In this case, this acts on the carrier 15 for the deformation thereof from the side of the carrier 15 which is remote from the workpiece 7.

In the exemplary embodiment, a plurality of actuating drives 16 are arranged distributed over the surface of the carrier 15. This can also refer to various types of actuating drive 16. These can be pneumatically driven.

At least one actuating drive 16 can be formed as a pneumatic muscle 17. This can have a tubular portion. This tubular portion can be acted upon by pressure, in particular air pressure, which brings about a change in length of the tubular portion and therefore leads to the generation of a drive movement.

In addition, or alternatively, an actuating drive 16 can also be configured as a pneumatic cylinder 18. In this case, both pneumatic cylinder 18 and pneumatic muscle 17 are provided as actuating drives 16.

With regard to the further configuration of the end effector, please refer to DE 10 2015 009 177 and/or DE 10 2011 106 214 A1. In terms of the configuration of the end effector 2, these applications form the subject matter of this application.

The end effector arrangement 1 or the manipulator 3, in particular the end effector 2, can have a switchable valve device 19 for connecting the gripper devices 6 to a supply source 20. The valve device 19 can have a plurality of valves.

A plurality of supply sources 20 can also be provided. The supply source 20 or the supply sources 20 can refer to a pressure source and/or a low pressure source.

The Bernoulli gripper unit 8 and the vacuum gripper units 11 are connected to various supply sources 20 here, in this instance to two pressure sources 20a, 20b. A pressure source 20a supplies a Venturi nozzle or a plurality of Venturi nozzles with compressed air for generating the low pressure for the vacuum gripper unit 11. A pressure source 20b supplies the Bernoulli gripper unit 8 with compressed air. In this case, the two pressure sources have varying pressure levels. In particular, the pressure source 20a for supplying the vacuum gripper unit 9 has a lower pressure level than the pressure source 20b for supplying the Bernoulli gripper unit 8.

It can be the case that a plurality of gripper devices 6 can be connected to the supply source 20 in a group by means of the valve device 19. In this case, the control 4 is provided to switch the valve device 19. In this case, this also controls the actuating arrangement 13. Moreover, the control 4 can also control the manipulator 3.

In this case, the groups of gripper devices can be formed in different ways. For example, a separate valve of the valve device 19 can be associated with each gripper device 6, so that each gripper device 6 is individually controllable. In this instance, purely on a control basis, the connection of the gripper device 6 to the supply source 20 in a group can take place by means of the control 4. However, the gripper devices 6 can be already connected in groups to valves of the valve device 19 such that a group can only be switched collectively. It is thus possible to save on valves.

In an exemplary embodiment, a group can be formed in the shape of a crown; a group can further be formed by gripper devices 6 arranged centrally on the end effector 2. In some embodiments, two gripper devices 6 arranged in the corners of an end effector 2 form a group and/or a row of gripper devices 6, in particular arranged along an edge, form a group. Moreover, individual gripper devices 6 which are not arranged next to each other on the end effector 2 can also form a group.

According to the proposal, the end effector arrangement 1 or the manipulator 3 having an end effector arrangement 1 are operated such that, during the holding of the workpiece 7, the control 4 switches between holding the workpiece 7 by means of at least one Bernoulli gripper unit 8 and holding the workpiece with at least one different gripper unit 10, in particular a vacuum gripper unit 11. In some embodiments, during the holding of the workpiece 7, the control switches a gripper device 6 between holding the workpiece by means of a Bernoulli gripper unit 8 and holding the workpiece by means of the different gripper unit 10, in particular the vacuum gripper unit 11.

In this case, the switching of the gripper devices 6 or between various gripper devices 6 takes place sequentially. In this case, the switching of the gripper devices or groups of gripper devices therefore takes place with a time delay. The workpiece can thus be held reliably during the switching procedure, since at least one gripper device, or a plurality of gripper devices, always hold the workpiece 7 when switching gripper devices or between gripper devices.

In this case, the workpiece 7 is picked up and/or deposited by the end effector 2 with at least one gripper device 6, such as with the majority of the active gripper devices 6, such as all active gripper devices 6, in the vacuum operating mode. It is thus possible to prevent surrounding workpieces from being impaired by the flow $S_B$ of a Bernoulli unit 8. Following the picking up of the workpiece 7, at least one gripper device 6, such as the majority of the active gripper devices 6, in particular all active gripper devices 6, is or are switched from a vacuum operating mode to a Bernoulli operating mode during the holding of the workpiece 7. In this case, however, at least one gripper device 6, such as at least two gripper devices 6, or such as precisely two gripper devices 6, can also remain in the vacuum operating mode.

The end effector 2, holding the workpiece, can displace this relative to the tool arrangement 5 in that it presses it against an, in particular stationary, aligning face 21. All active gripper devices 6 can be in the Bernoulli operating mode.

In this case, following the picking up of the workpiece 7 (FIG. 3a), the end effector 2 can moreover shape the workpiece 7 prior to depositing it (FIG. 3d) by adjusting the actuating arrangement 13. This can be seen with reference to FIGS. 3b and 3c. In this case, for shaping the workpiece, the majority, in particular all, of the active gripper devices 6 with the exception of one or two gripper devices 6 are operated in the Bernoulli operating mode.

Alternatively to displacing the workpiece 7 relative to the tool arrangement 5 by pressing against an aligning face 21, the workpiece 7 can also be displaced by shaping the workpiece 7 relative to the tool arrangement 5. To this end, in this case, the majority, in particular all, of the active gripper devices 6 with the exception of one or two gripper devices 6 are operated in the Bernoulli operating mode. Two mutually opposed shaping movements of the end effector 2, in which varying active gripper devices are operated in particular in the vacuum operating mode, not in the Bernoulli operating mode, enable the displacement of the workpiece 7 in relation to the tool arrangement 5 in a snake-like movement.

Accordingly, following the picking up of the workpiece and/or prior to the depositing of the workpiece, in particular during transportation and/or the shaping of the workpiece 7, the workpiece 7 is held by the end effector 2 by means of the majority of the active gripper devices 6, such as all active gripper devices 6, in particular with the exception of one or two gripper devices 6, in the Bernoulli operating mode.

Prior to the depositing of the workpiece 7, at least one gripper device 6, such as the majority of the active gripper devices 6, in particular all active gripper devices 6, is or are switched from a Bernoulli operating mode to a vacuum operating mode during the holding of the workpiece 7. To facilitate the release of the workpiece 7, it can be provided that, during the depositing of the workpiece 7 in the vacuum operating mode, a compressed air pulse of at least one Bernoulli gripper unit 8, such as at least a majority of the Bernoulli gripper units 8, in particular all gripper units 8, is generated to release the gripper device 6 from the workpiece 7.

In this case, to carry out the method described above, the control 4 is formed for switching the gripper devices 6 individually or in groups to various operating modes. The control 4 can switch the gripper devices 6 to an active operating mode, in which the gripper device 6 can exert or exerts a holding force on the workpiece 7, and to an inactive operating mode, in which the gripper device does not exert or cannot exert a holding force on the workpiece 7. In this case, the "active" operating mode has a vacuum operating mode and/or a Bernoulli operating mode and optionally a combined operating mode. In these operating modes, the control 4 can, in this case, also switch the gripper units 6 or switch between these operating mode.

The gripper device 6 per se will now be described in more detail with reference to FIGS. 4 to 6. As already described, a plurality of gripper devices 6 are provided on the end effector 2 according to the proposal. In this case, the gripper devices 6 hold the workpiece 7 via the gripper faces 22 associated with the individual gripper devices 6. In this case, these form an entire gripper face 23.

The gripper device 6 has a Bernoulli gripper unit 8. The Bernoulli gripper unit has a discharge unit 9 for channelling a flow $S_B$ from the Bernoulli gripper unit 8 between gripper device 6 and workpiece 7 in a manner such that, in a delimited region—Bernoulli low-pressure region 24—a low static pressure can be generated on the gripper face 22 by the flow $S_B$ for holding the workpiece 7. In addition to the static pressure component, the flow has a dynamic pressure component. In this regard, please refer to the Bernoulli equation.

The gripper device 6 according to the proposal further has a vacuum gripper unit 11. This comprises a suction chamber 12. By means of the suction chamber 12, a low static pressure can be generated in a delimited region on the grip face 22—vacuum/low-pressure region 25—for holding the workpiece 7. In this case, a static state arises during the holding of the workpiece 7. In some embodiments, during the holding of the workpiece with the vacuum gripper unit 11, there is substantially no flow in the suction chamber 12, which means that the dynamic pressure here is substantially equal to zero.

In this case, the use of the term "vacuum" means a pressure which is lower than the atmospheric pressure. This applies in particular in conjunction with the terms "vacuum gripper unit", "vacuum low-pressure region" and "vacuum operating mode".

In this case, during the holding of the workpiece 7, the suction chamber 12 substantially forms a closed space with the workpiece 7. Thus, to pick up a workpiece 7, it is only necessary to generate a low pressure in the suction chamber 12, which then substantially only needs to be maintained to hold the workpiece 7. This enables a particularly low energy consumption. In this regard, during the holding of the workpiece 7 with the vacuum gripper unit 11, the region between the workpiece 7 and the gripper device 6 is formed to be substantially without a flow. During the holding of the workpiece 7 with the vacuum gripper unit 11, a static state is therefore substantially established in the gripper device 6, in particular in the suction chamber 12.

In contrast to this, to hold the workpiece 7 with the Bernoulli gripper unit 8, a flow $S_B$ is continuously generated, at least in a sub-region between the gripper device 6 and the workpiece 7.

To create a particularly compact gripper device 6, which holds the workpiece 7 reliably and can be used flexibly, the Bernoulli low-pressure region 24 and the vacuum low-pressure region 25 overlap at least partially here, or the Bernoulli low-pressure region 24 and the vacuum low-pressure region 25 surround each other. The gripper device can thus be used extremely flexibly for workpieces 7 of varying sizes.

In the exemplary embodiment shown in the figures, the Bernoulli low-pressure region 24 is arranged completely in the vacuum low-pressure region 24. However, it can alternatively also be provided that the vacuum low-pressure region 25 is arranged completely in the Bernoulli low-pressure region 24.

It can further be provided that the Bernoulli low-pressure region 24 and the vacuum low-pressure region 25 surround each other. In this instance, the Bernoulli low-pressure region 24 and the vacuum low-pressure region 25 can be separated from each other. Particularly, the Bernoulli low-pressure region 24 and the vacuum low-pressure region 25 can adjoin each other directly in this instance and can be separated in particular merely by a barrier.

Figure 4:
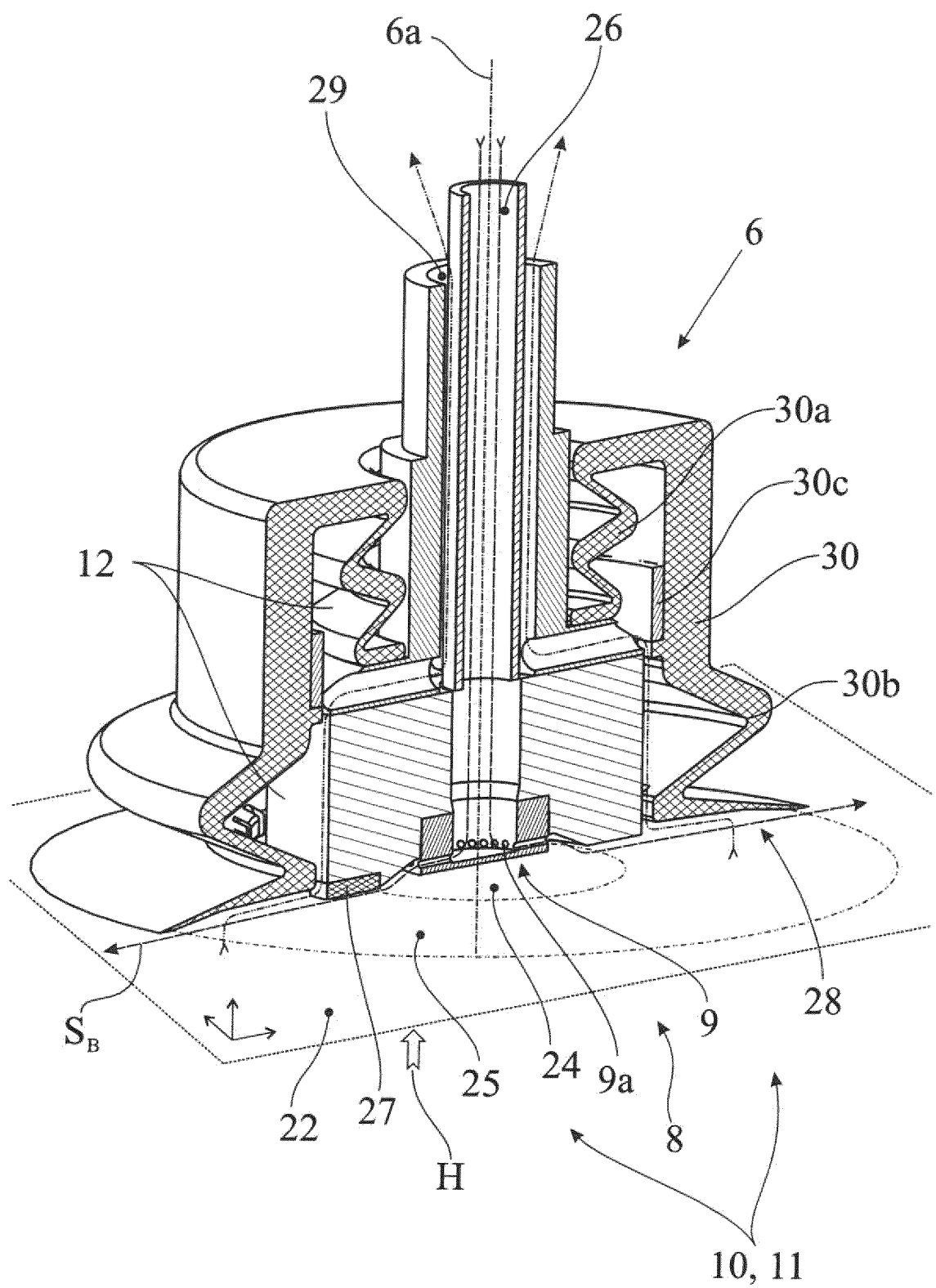
FIG. 4 a gripper device, which can be arranged on the end effector according to the proposal.
Figure 5:
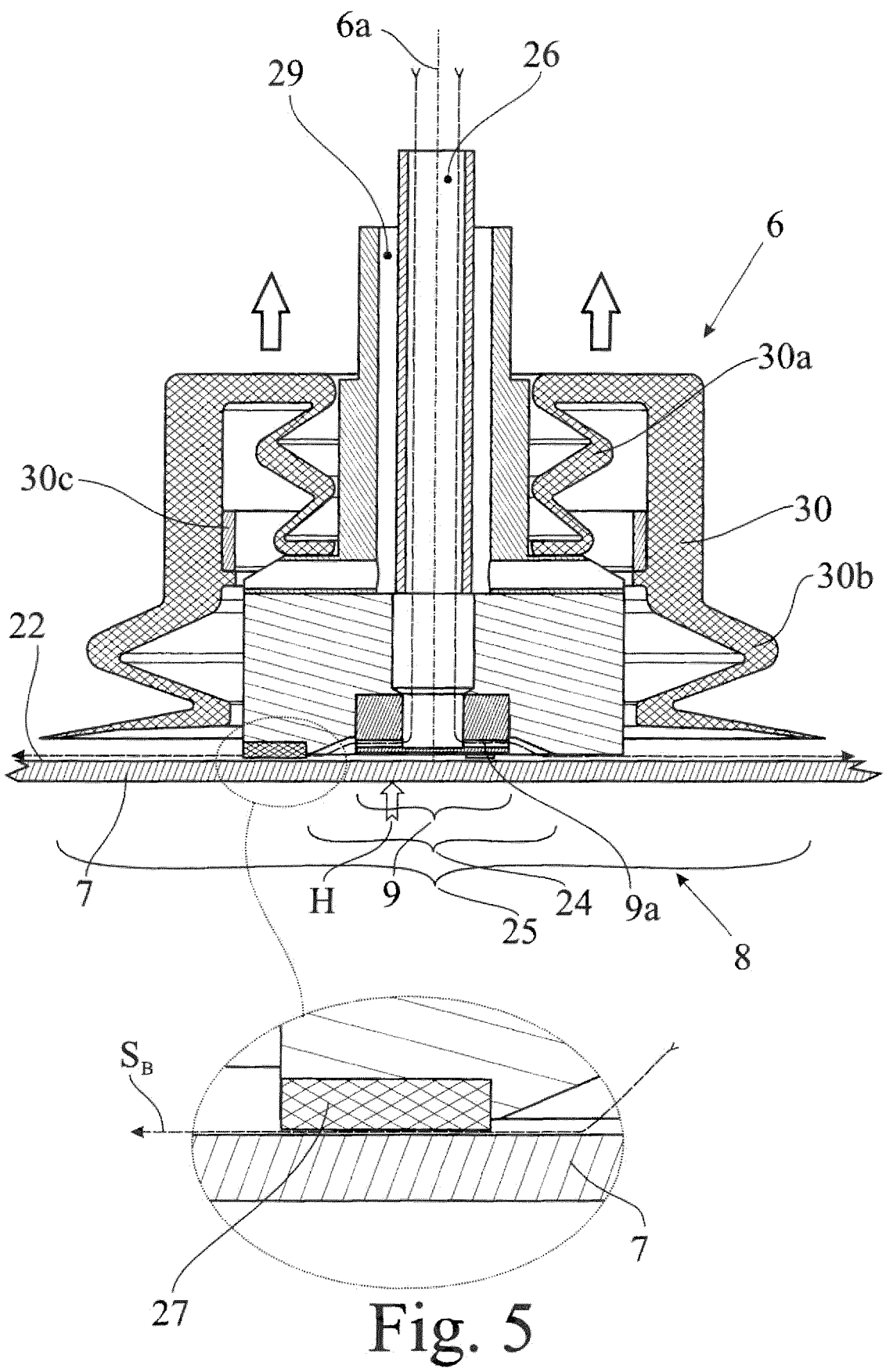
FIG. 5 the gripper device according to FIG. 4 in a Bernoulli operating mode.
Figure 6:
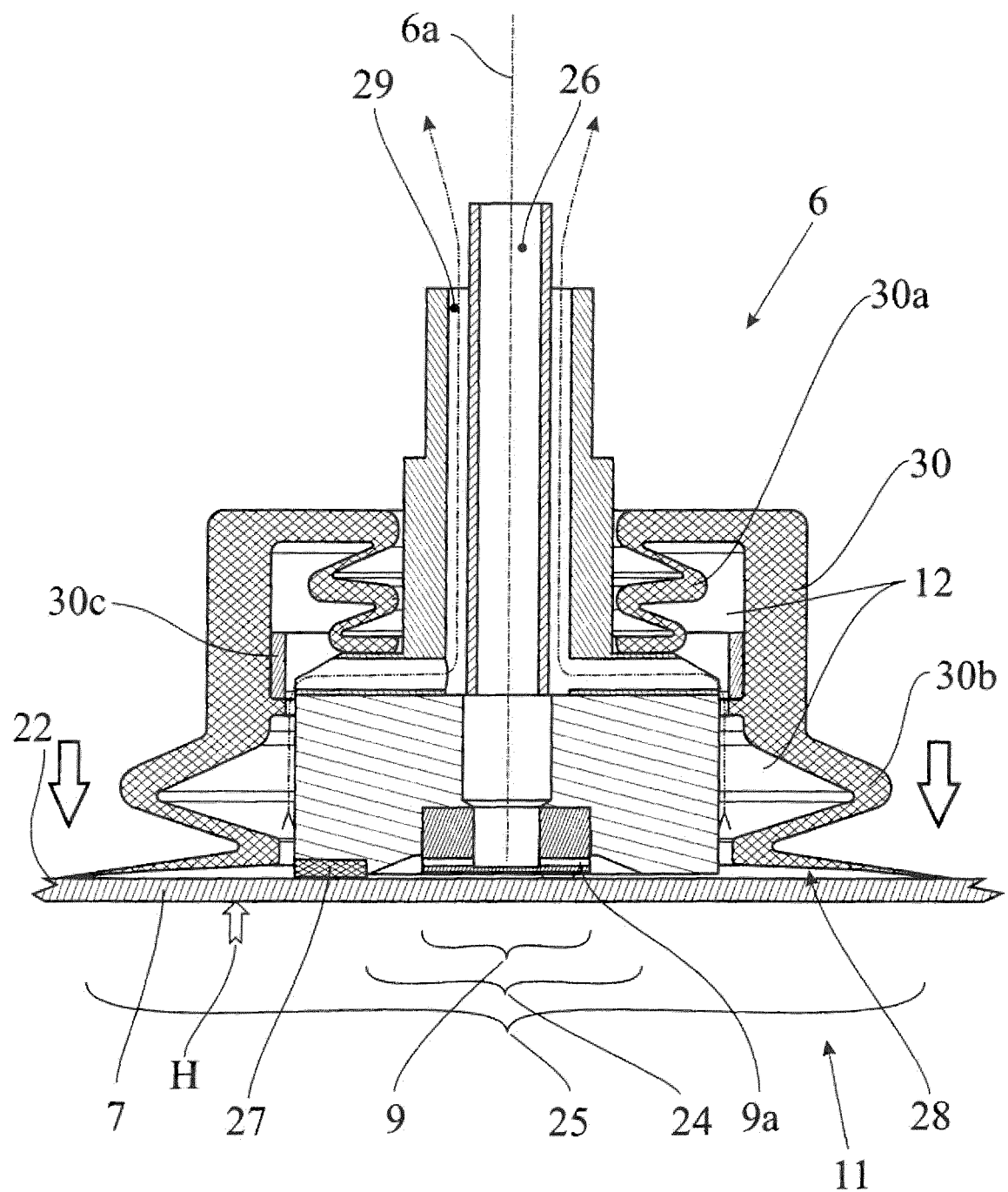
FIG. 6 the gripper device according to FIG. 5 in a vacuum operating mode.

As shown in FIGS. 4 to 6, the Bernoulli gripper unit 8 is arranged at least partially—in this case, completely—in the vacuum gripper unit 11. In this instance, the Bernoulli gripper unit 8 can be arranged at least partially—in this case, completely—in the suction chamber 12. However, in an alternative configuration, it can also be provided that the vacuum gripper unit 11 is arranged at least partially, and in some embodiments completely, in the Bernoulli gripper unit 8.

In this case, the Bernoulli gripper unit 8 enables floating holding of the planar workpiece 7 with a degree of freedom of movement. In this case, the region of the workpiece 7 which is held by a Bernoulli gripper unit 8 can be moved relative to the Bernoulli gripper unit 8 orthogonally in two axes with respect to the holding force H which results from the low static pressure generated by the Bernoulli gripper unit 8.

In this case, the workpiece 7 can therefore also be moved along the workpiece face during the holding of the workpiece 7. With this, the flow $S_B$ enabling the holding of the workpiece 7 with the Bernoulli gripper unit 8 in this case, forms an air cushion on which the workpiece 7 can be displaced.

In this case, the vacuum gripper unit 11, on the other hand, enables a fixed holding of the workpiece 7 without a degree of freedom of movement of the workpiece 7 along the workpiece face. The workpiece 7 is therefore not displaceable in relation to the vacuum gripper unit 11 in the vacuum operating mode. In this regard, an active Bernoulli gripper unit 8 forms a type of slide bearing, whilst an active vacuum gripper unit 11 forms a type of fixed bearing for the workpiece 7.

In this case, the gripper device 6 can have a Bernoulli operating mode, in which the workpiece 7 is held by the Bernoulli gripper unit 8, and/or a vacuum operating mode, in which the workpiece 7 is held by the vacuum gripper unit 11. In addition, or alternatively, the gripper device 6 can have a combined operating mode, in which the workpiece 7 is held by the Bernoulli gripper unit 8 and by the vacuum gripper unit 11. It is the case here, that the gripper device 6 holds the workpiece 7 primarily, in particular exclusively, by means of the Bernoulli gripper unit 8 in the Bernoulli operating mode and primarily, in particular exclusively, by means of the vacuum gripper unit 11 in the vacuum operating mode.

The Bernoulli gripper unit 8 has a pressure line 26 for applying the compressed air to the, in particular cylindrical, discharge unit 9. As shown in FIG. 5, the compressed air flows through the pressure line into the discharge unit 9 and is channelled out radially from this. To this end, in this case, the discharge unit 9 has a multiplicity of openings 9a, which are distributed over the radius. The centre axes of the openings 9a can extend substantially parallel to the gripper face 22. Alternatively, however, these can also be inclined at an angle of up to 30° in relation to the gripper face 22. As can be seen in FIG. 5, in this case, an air cushion forms between the workpiece 7 and the gripper device 6, in particular the Bernoulli gripper unit 8, which air cushion is formed by the flow $S_B$ which also generates the low pressure for holding the workpiece 7. The workpiece 7 is held substantially without contact here by the Bernoulli gripper unit 8.

The gripper device 6, in particular the Bernoulli gripper unit 8, further has supporting elements 27. These ensure that a gap remains between workpiece 7 and gripper device 6 in the Bernoulli operating mode, c.f. FIG. 5. The flow $S_B$ can thus be prevented from breaking down. The workpiece 7 can be reliably held in the Bernoulli operating mode.

The vacuum gripper unit 11 has the suction chamber 12. The suction chamber 12 leads into a suction opening 28, which delimits the vacuum low-pressure region 25 on the gripper face 22 here. The holding force for holding the workpiece 7 is generated by applying a low pressure to the suction chamber 12. To this end, this can be connected via a low-pressure line 29 to a low-pressure source 20b, in particular low-pressure pump, and/or a Venturi nozzle.

The suction chamber 12 can be tubular in form, at least in some sections. In this case, it is formed by a bellows-type suction body 30, such as a folding-bellows-type suction body. In this case, a reinforcing element 30c, in particular made from plastics and/or metal, is arranged in the bellows-type suction body 30.

As shown in FIG. 5, this bellows-type suction body 30 is, incidentally, resiliently mounted on the gripper device, in particular via a separate spring portion 30a. Moreover, the bellows-type suction body 30 has a spring portion 30b in the region of the suction opening for lying resiliently against the workpiece.

The bellows-type suction body 30 can be formed in one part, in particular integrally, as shown in FIG. 3 to 5, or it can be formed in a plurality of parts. The bellows-type suction body 30 can have a plurality of bellows-type suction body parts, in particular two or three bellows-type suction body parts. These can vary in terms of their material properties.

As can be seen in FIG. 1, supporting portions 31 for supporting and lying against the workpiece 7 are provided here in the suction opening 28. In this case, these are formed on the bellows-type suction body 30.

The vacuum gripper unit 11 further has a low-pressure line 29 for applying a low pressure to the suction chamber 12. In this case, the centre axes of the low-pressure line 29 and the pressure line 26 extend coaxially, at least in some sections. In some embodiments, the low-pressure line 29 is accommodated in the pressure line 26 and/or if the pressure line 26 is accommodated in the low-pressure line 29, as shown in the exemplary embodiment. Such a design enables an especially simple connection of the gripper device 6 to an end effector 2.

In this case, the gripper device 6 is formed as a pre-assembled unit, which can be assembled as a unit on an end effector 2. If the low-pressure line 29 is accommodated in the pressure line 26 or the pressure line 26 is accommodated in the low-pressure line, such an assembly is possible in a particularly simple manner by means of a screw connection. In this case, the gripper device 6 is connected to the end effector 2 with force fit and/or form fit so that simple replacement of a defective gripper device 6 is possible.

The invention claimed is:

1. An end effector arrangement comprising:
an end effector for a manipulator and a control for the end effector,
wherein the end effector has a tool arrangement having a plurality of gripper devices for holding a workpiece over a tool surface,
wherein at least one gripper device has a Bernoulli gripper unit, which has a discharge unit for channeling a flow from the Bernoulli gripper unit between gripper device and workpiece surface in a manner such that, in a region between gripper device and workpiece surface, the flow generates a low static pressure for holding the workpiece,
wherein at least one gripper device has a different gripper unit, which holds the workpiece according to a physical principle which differs from that of the Bernoulli gripper unit,
wherein the control is designed such that, during the holding of the workpiece, it switches the end effector between holding the workpiece by at least one Bernoulli gripper unit and holding the workpiece with at least one different gripper unit and,
wherein the end effector has an actuating arrangement, the adjustment of which enables the gripper devices of the tool arrangement to be adjusted relative to each other, wherein the end effector has a carrier arrangement on which the gripper devices forming the tool arrangement are arranged and wherein, by the actuating arrangement, the gripper devices are adjustable with respect to each other via an adjustment of the carrier arrangement.

2. The end effector arrangement according to claim 1, wherein the different gripper unit, which carries the workpiece according to a different physical principle, is a vacuum gripper unit having a suction chamber, wherein, in the suction chamber and therefore in a delimited region between the vacuum gripper unit and the workpiece, a low pressure can be generated for holding the workpiece.

3. The end effector arrangement according to claim 1, wherein a gripper device having a Bernoulli gripper unit has a Bernoulli operating mode, in which the workpiece is held by the Bernoulli gripper unit, and/or in that a gripper device having a vacuum gripper unit has a vacuum operating mode, in which the workpiece is held by the vacuum gripper unit.

4. The end effector arrangement according to claim 3, wherein a gripper device has a Bernoulli gripper unit for operating the gripper device in a Bernoulli operating mode and a vacuum gripper unit for operating the gripper device in a vacuum operating mode.

5. The end effector arrangement according to claim 4, wherein the gripper device has a combined operating mode, in which the workpiece is held by the Bernoulli gripper unit and by the vacuum gripper unit.

6. The end effector arrangement according to claim 1, wherein the actuating arrangement has at least one adjustable actuating drive, which acts on the carrier for the deformation thereof.

7. A method for operating an end effector arrangement according to claim 1,
  wherein the end effector has a tool arrangement having a plurality of gripper devices for holding a planar workpiece,
  wherein, during the holding of the workpiece, the control switches between holding the workpiece by at least one Bernoulli gripper unit and holding the workpiece with at least one different gripper unit.

8. The method according to claim 7, wherein, during the holding of the workpiece, the control switches a gripper device between holding the workpiece by a Bernoulli gripper unit and holding the workpiece by the different gripper unit.

9. The method according to claim 7, wherein the end effector shapes the workpiece via an adjustment of the actuating device prior to the depositing of the workpiece.

10. The method according to claim 7, wherein the end effector, holding the workpiece, displaces this relative to the tool arrangement, wherein the end effector displaces the workpiece relative to the tool arrangement by pressing against an aligning face, or in that the end effector displaces the workpiece relative to the tool arrangement by shaping the workpiece.

11. The method according to claim 7 wherein, to displace the workpiece relative to the tool arrangement, all active gripper devices are operated in the Bernoulli operating mode.

12. The method according to claim 7, wherein the control is formed for switching the gripper devices to various operating modes individually or in groups.

13. The method according to claim 7, wherein the workpiece is picked up and/or deposited by the end effector with at least one gripper device in the vacuum operating mode.

14. The method according to claim 7, wherein, following the picking up of the workpiece, at least one gripper device is switched from a vacuum operating mode to a Bernoulli operating mode during the holding of the workpiece, and/or
  wherein, prior to the depositing of the workpiece, at least one gripper device is switched from a Bernoulli operating mode to a vacuum operating mode during the holding of the workpiece.

15. The method according to claim 7, wherein at least one gripper device remains in the vacuum operating mode.

16. The method according to claim 7, wherein, following the picking up of the workpiece and/or prior to the depositing of the workpiece, the workpiece is held by the end effector by the majority of the active gripper devices in the Bernoulli operating mode.

17. The method according to claim 7, wherein, during the depositing of the workpiece in the vacuum operating mode, a compressed air pulse of at least one Bernoulli gripper unit is generated to release the gripper devices from the workpiece.

18. A manipulator comprising at least three axes, and an end effector arrangement according to claim 1.

* * * * *